United States Patent [19]

Nemoto et al.

[11] Patent Number: 4,589,105
[45] Date of Patent: May 13, 1986

[54] FLEXIBLE DISC CASSETTE

[75] Inventors: Tsuneo Nemoto, Miayagi; Osamu Koizumi; Koukichi Sugawara, both of Miyagi, all of Japan

[73] Assignee: Sony Corporation, Tokyo, Japan

[21] Appl. No.: 607,767

[22] Filed: May 7, 1984

[30] Foreign Application Priority Data

May 13, 1983 [JP] Japan .................. 58-71322[U]

[51] Int. Cl.⁴ ............................................. G11B 23/02
[52] U.S. Cl. .................................. 369/291; 206/312; 206/444; 360/133
[58] Field of Search ............... 369/291, 273; 360/133; 206/444, 312

[56] References Cited

U.S. PATENT DOCUMENTS 4,443,874 4/1984 Steenberg ........................ 369/291

FOREIGN PATENT DOCUMENTS

| 42311 | 3/1980 | Japan | 360/133 |
| 130475 | 8/1983 | Japan | 360/133 |
| 2102188 | 1/1983 | United Kingdom | 360/133 |

Primary Examiner—Steven L. Stephan
Attorney, Agent, or Firm—Hill, Van Santen, Steadman & Simpson

[57] ABSTRACT

A flexible disc cassette is provided with a shutter which is capable of opening/closing a head access hole and a pad insertion hole respectively formed in upper and lower halves thereof. A V-shaped torsion spring is used as the spring for biasing the shutter in the closed position. The lengths of the linear arm portions integrally formed with both sides of the coiled portion of the spring are approximately the same. Both tips of the arm portions are bent at approximately 90° so as to form the L-shaped hooks which has the same length and which extend in the opposite directions along the height of the coiled portion. The L-shaped hooks are stopped by the shutter and the cassette case.

3 Claims, 19 Drawing Figures

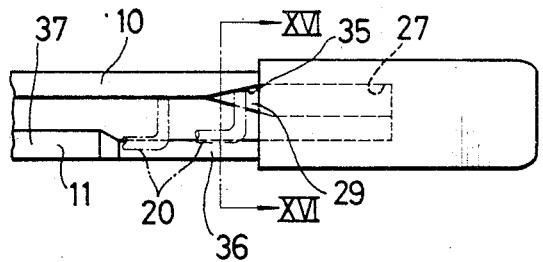
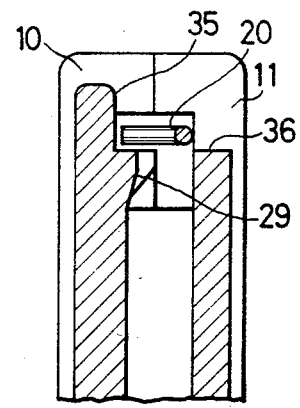
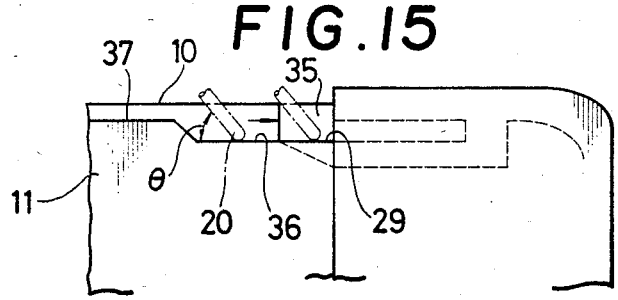
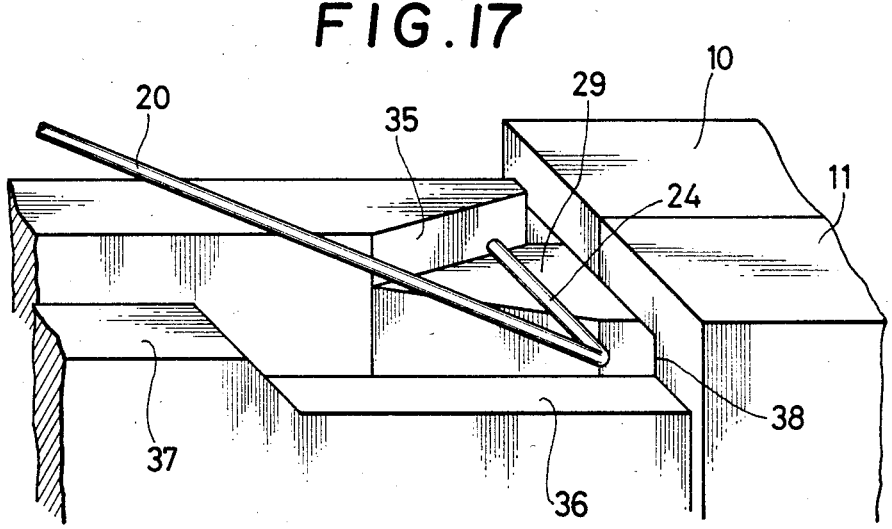

FLEXIBLE DISC CASSETTE

BACKGROUND OF THE INVENTION

1. Field of the Invention

The present invention relates to a flexible disc cassette such as floppy disc or the like used for magnetic disc cassette recording and/or reproducing apparatus.

2. Description of the Prior Art

A conventional disc cassette of this type comprises a disc-shaped flexible magnetic sheet which is held between upper and lower halves. A head access hole is formed in one of the upper and lower halves. Further, a shutter which is capable of opening/closing the head access hole is mounted on the cassette case such that the intrusion of dust and the foreign substances into the cassette can be prevented. The shutter is normally biased by a coil spring or the like in the position where the head access hole is closed.

In such a conventional structure, when the cassette is loaded into or removed from the recording and/or reproducing apparatus, the shutter can be automatically moved to the open or closed position, so that it is very convenient for a user. However, since a small spring must be mounted in the cassette, the man-hour of assembly is increased, so that it becomes inconvenient for a manufacturer. Particularly, when automatic disc cassette assembling machine is used, it is more difficult to handle elastic members such as a coil spring than rigid members. Therefore, special implementation and proper adjustment are required in the holding means and insertion means (mount means) of the automatic assembling machine.

The present inventor, therefore, has previously proposed a flexible disc cassette in which a torsion spring is used for urging a shutter, as shown in FIG. 1. Referring to FIG. 1, a torsion spring 1 is made by winding, for example, a stainless steel wire several turns to constitute a coiled portion 2. Both tips 3 and 4 of the coiled portion 2 linearly extend along the tangential direction of the coiled portion 2. One U-shaped tip 3 engages with the pin formed inside one of the upper and lower halves. The other tip 4 is bent substantially perpendicularly and is locked with the stop of the shutter. When the U-shaped tip 3 is closely fitted around the pin of the half, the spring 1 is mounted inside the half. Further, since the other tip 4 can be stopped at the stop of the shutter by the biasing force of the spring 1 itself, automatic or manual assembly can be easily performed.

However, since the tip 3 of the spring 1 has a complex shape, it is difficult to manufacture the spring 1. In addition, since the dimensional accuracy of the tip 3 is not high, the tip 3 is often released from the pin of the half because of its weak elastic fitting force, and cannot be automatically assembled because of variations in optimal fitting angles. Furthermore, the springs become entangled with each other to degrade the assembly efficiency.

SUMMARY OF THE INVENTION

It is an object of the present invention to simplify the shape of a spring for biasing the shutter in the closed position so as to easily perform manual or automatic assembly operations.

According to an aspect of the present invention, there is provided a flexible disc cassette which comprises a cassette case having upper and lower halves for holding a flexible disc therebetween, a shutter, slidably mounted on the cassette case, for opening/closing a head access hole of the case, and a V-shaped spring for biasing the shutter to the position where the head access hole is closed.

According to another aspect of the present invention, there is provided a flexible disc cassette wherein the V-shaped spring has a coiled portion and linear arm portions having approximately the same length and extending from both ends of the coiled portion, and both tips of the arm portions are oppositely bent at approximately 90° along the height of the coiled portion so that L-shaped hooks having the same length are stopped at the shutter and the cassette case.

BRIEF DESCRIPTION OF THE DRAWINGS

FIGS. 2 to 11 show a flexible disc cassette according to an embodiment of the present invention, in which FIG. 2 is a plan view of the cassette, FIG. 3 is a partial plan view showing the cassette when a shutter is open, FIG. 6 is a side-elevational view of the main part of the disc cassette so as to show the structure in which the torsion spring is mounted, FIG. 7 is a plan view of the main part of the disc cassette, FIGS. 8 and 9 are respectively partial sectional views taken along the lines VIII—VIII and IX—IX of FIG. 7, and FIGS. 10 and 11 are respectively side-elevational and plan views of the main part of the disc cassette showing an assembly operation of the torsion spring;

FIGS. 14 to 17 show a modification of a spring insertion opening of the cassette case, in which FIGS. 14 and 15 are respectively side-elevational and plan views of the main part of the cassette case which is the same as that of FIGS. 6 and 7, FIG. 16 is a sectional view taken along the line XVI—XVI of FIG. 14, and FIG. 17 is a perspective view of the main part of the cassette case.

DETAILED DESCRIPTION OF THE PREFERRED EMBODIMENT

The present invention will now be described with reference to the following embodiments.

Figure 2:
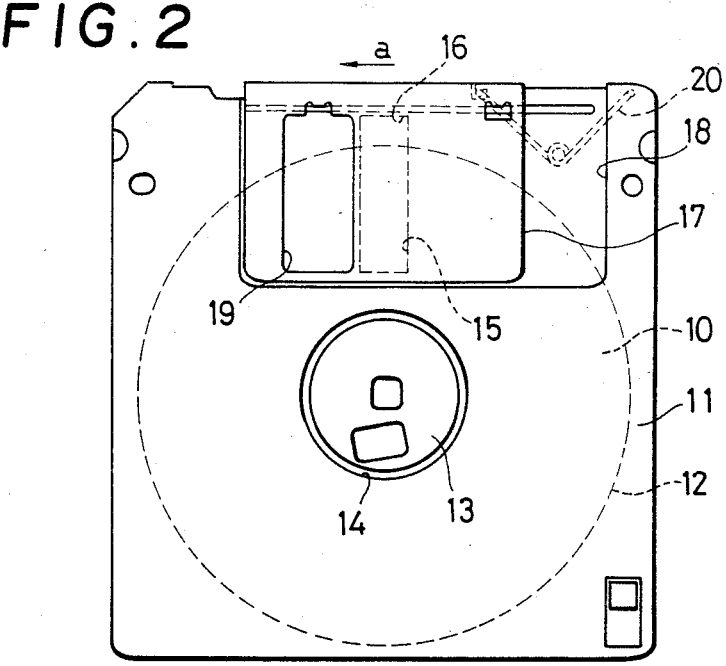
Figure 3:
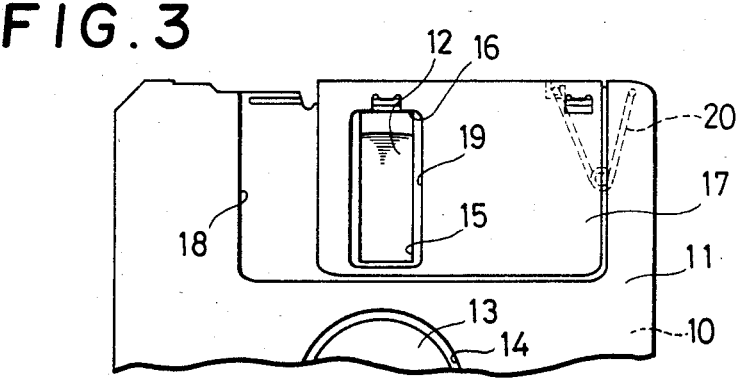
Figure 4B:
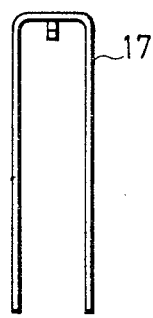
FIGS. 4A and 4B are respectively plan and side views of the shutter.
Figure 4A:
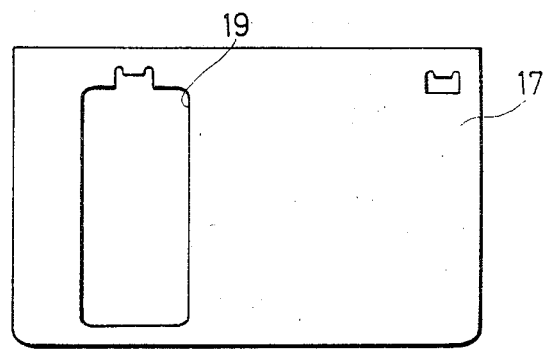

FIG. 2 is a plan view showing a flexible disc cassette according to the present invention, FIG. 3 is a partial plan view showing the flexible disc cassette when a shutter thereof is open, and FIGS. 4A and 4B are respectively plan and side views showing the shutter.

As shown in FIGS. 2 and 3, the flexible disc cassette comprises an upper half 10 and a lower half 11. A flexible disc 12 is rotatably held between the upper and lower halves 10 and 12, and has a metal center core 13. The center core 13 is chucked by the spindle of the disc drive unit through a center hole 14 formed in the lower half 11. A rectangular head access hole 15 is radially formed in the lower half 11. A pad insertion hole 16 is formed in the upper half 10 at the position corresponding to the hole 15.

In order to close the head access hole 15 and the pad insertion hole 16, as shown in FIGS. 4A and 4B, a shutter 17 is reciprocally fitted in recesses 18 of the upper and lower halves 10 and 11, so that the shutter 17 partially extends astride the cassette case. Window apertures 19 are formed in both surfaces of the shutter 17 such that the apertures 19 respectively correspond to the holes 15 and 16. When the shutter 17 is located in the open position, as shown in FIG. 3, the apertures 19 are respectively aligned with the holes 15 and 16 so that the head and the pad can be inserted therein. On the other hand, when the shutter 17 is located in the closed position, as shown in FIG. 2, the pad insertion hole 16 and the head access hole 15 are closed by the shutter 17. While the flexible disc cassette is not used, the shutter 17 is biased in the direction indicated by an arrow a of FIG. 2 by a torsion spring 20 which is contracted between the shutter 17 and the cassette case, whereby the shutter 17 is maintained at the closed position shown in FIG. 2.

Figure 5A:
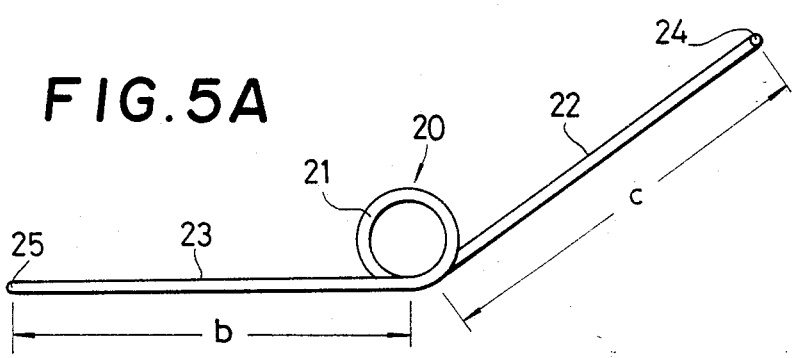
FIGS. 5A and 5B are respectively plan and side views of a torsion spring 20.
Figure 5B:
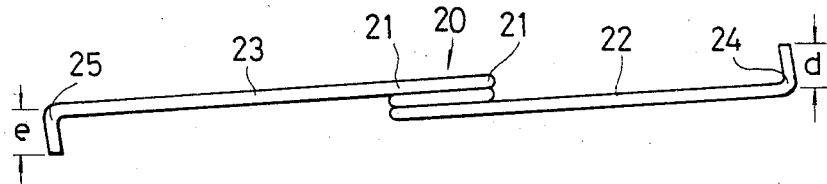

FIGS. 5A and 5B are respectively plan and side views of the torsion spring 20. The spring 20 is made by winding a stainless steel wire several turns to constitute a coiled portion 21. Arm portions 22 and 23 linearly extend outward from both sides of the coiled portion 21 of the spring 20. The tips of both the arm portions 22 and 23 are bent at approximately 90° to provide L-shaped hooks 24 and 25. The L-shaped hooks 24 and 25 extend in the opposite directions along the height of the coiled portion 21. A length b of the arm portion 23 is the same as a length c of the arm portion 22, and a length d of the L-shaped hook 24 is also the same as a length e of the L-shaped hook 25. Therefore, the V-shaped shutter spring 20 has a point-symmetry structure so that any one of the L-shaped hooks 24 and 25 can be a fixed end for the shutter 17 or the cassette case.

Figure 1:
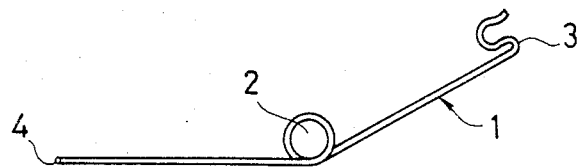
FIG. 1 is a plan view showing the shape of a conventional torsion spring for biasing a shutter of a flexible disc cassette.

In other words, since the spring 20 can be freely mounted without considering the mounting direction, automatic or manual assembly can be easily performed. In addition to an advantage in that the spring 20 has a simple structure and can be easily manufactured, the spring 20 does not have any U-shaped hook which is used in the conventional structure shown in FIG. 1, and the springs do not entangle with each other, thereby improving the assembly efficiency. Furthermore, since the L-shaped hooks 24 and 25 of the spring 20 extend along the height of the coiled portion 21, the height of the spring 20 can be lowered along the thickness of the flexible disc cassette. Therefore, the spring 20 can be suitably used for a thinner cassette.

Figure 6:
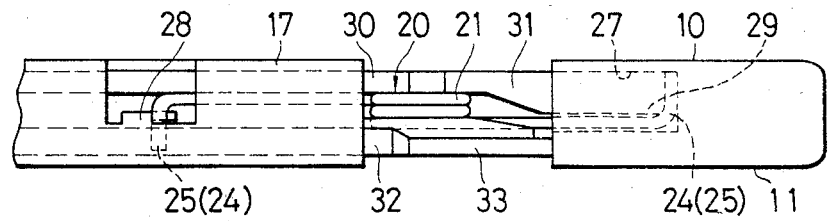
Figure 7:
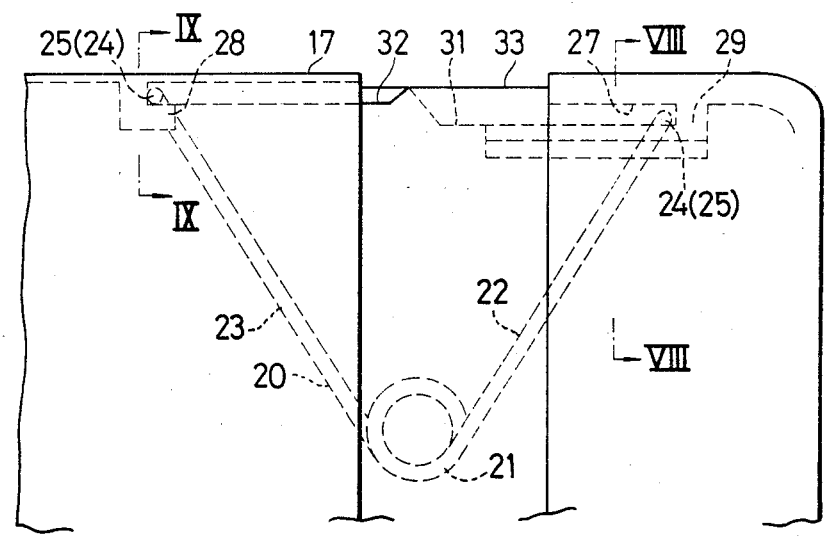
Figure 8:
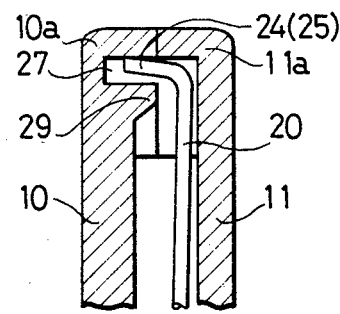
Figure 9:
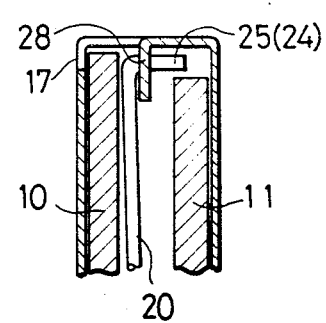

The structure of the cassette to mount the spring 20 between the cassette case and the shutter 17 will be explained. FIG. 6 is a side-elevational view of the main part of the flexible cassette showing the structure in which the spring 20 is mounted, and FIG. 7 is a plan view thereof. FIGS. 8 and 9 are partial sectional views taken along the lines VIII—VIII and IX—IX of FIG. 7, respectively.

The L-shaped hook 24 (or 25) of the spring 20 shown in FIG. 5 is inserted and stopped in a recess 27 which is formed in the inner surface of the upper half. The L-shaped hook 25 (or 24) is stopped at a hook portion 28 of the shutter 17 which is formed by partially punching and bending its upper side surface inward. As shown in FIG. 8, the recess 27 is surrounded by upper side surfaces 10a and 11a of the upper and lower halves 10 and 11 and an overhang portion projecting on the inner surface of the upper half 10. Therefore, the spring 20 will not be removed from the recess 27 in the vertical and horizontal directions of FIG. 8. Further, the spring 20 will not be removed from the recess 27 since the biasing force thereof acts along the insertion direction.

On the other hand, the L-shaped hook 25 (or 24) is hooked by the hook portion 28 of the shutter 17, as shown in FIG. 9, so that the spring 20 will not be disengaged from the hook portion 28 upward and to the right in FIG. 9 by means of the shutter 17, to the left therein by means of the upper half 10, and downward therein by means of the lower half 11.

In order to easily mount the spring 20, a step portion 31 whose surface is slightly lower than an upper side surface 30 is provided in the vicinity of the opening of the recess 27 on the upper half 10, as shown in FIGS. 6 and 7. The step portion 31 is connected to the overhang portion 29 which defines the recess 27. A step portion 33 whose surface is slightly higher than an upper side surface 32 is formed on the lower half 11 at the position corresponding to the step portion 31 of the upper half 10.

Figure 10:
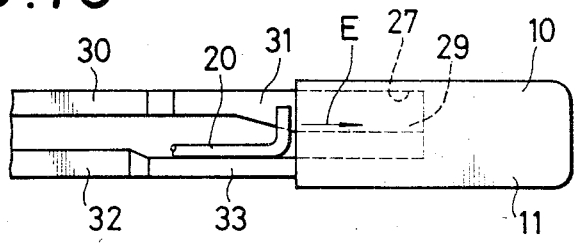
Figure 11:
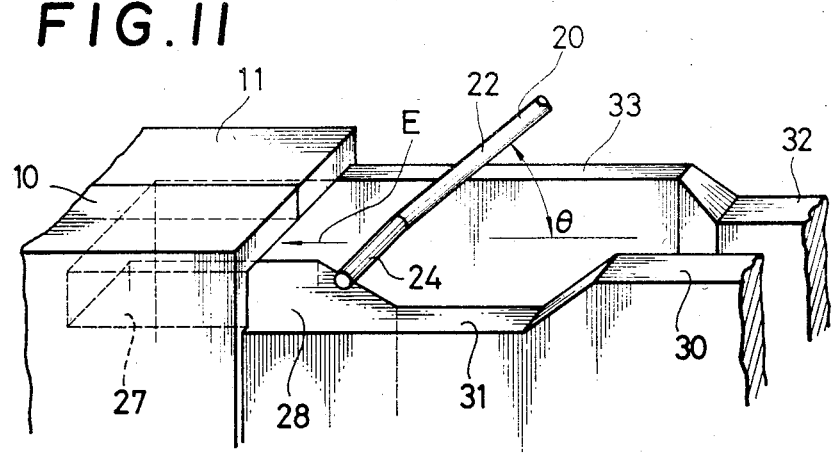

FIGS. 10 and 11 are respectively side-elevational and perspective views of the main part of the spring 20 for explaining the mounting operation of the spring 20. Referring to FIGS. 10 and 11, the arm portion 22 of the spring 20 is urged against the surface of the higher step portion 33 of the lower half 11, and the L-shaped hook 24 is urged against the surface of the lower step portion 31 of the upper half 10. Subsequently, the spring 20 is slidably guided by the step portions 31 and 33 in the direction indicated by an arrow E so that the spring 20 can be inserted into the recess 27. Note that since the lower step portion 31 is provided, the insertion angle $\theta$ (FIG. 11) of the spring 20 can be small. Therefore, the spring 20 can be linearly inserted into the recess 27. For this reason, manual or automatic assembly operations can be easily performed.

Figure 12:
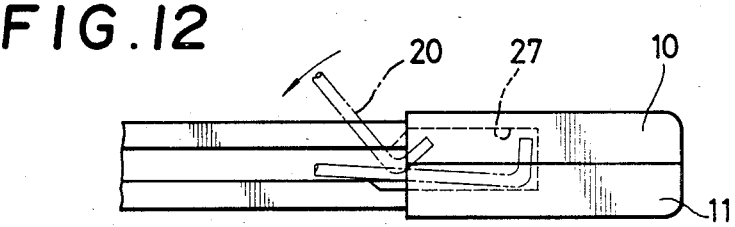
FIGS. 12 and 13 are respectively side-elevational and plan views of the main part of the cassette case showing an assembly operation of the V-shaped shutter spring when a guide structure of the spring is not provided.
Figure 13:
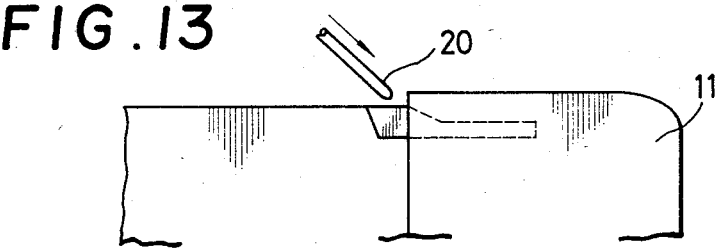

When any guide means such as the step portions 31 and 33 are not provided, the spring 20 must be squeezed into the recess 27, as shown in FIGS. 12 and 13. In this case, it is difficult to perform automatic assembly.

A modification of the present invention will be described with reference to FIGS. 14 to 17. FIGS. 14 to 17 are views showing the detailed construction of the spring insertion opening, wherein FIGS. 14 and 15 are respectively side-elevational and plan views of the main part of the cassette case same as that shown in FIGS. 6 and 7, FIG. 16 is a sectional view taken along the line XVI—XVI of FIG. 14, and FIG. 17 is a perspective view of the main part of the cassette case. In this modification, the recess 27 is defined by the upper surfaces of the upper and lower halves 10 and 11 and the overhang portion 29 in the same manner as shown in the embodiment of FIGS. 6 to 9. The overhang portion 29 of the recess 27 at the spring insertion opening is tapered toward its bottom so as to define an inclined surface 35 which communicates with the recess 27. On the other hand, a step portion 36 is formed at the side edge of the spring insertion opening of the lower half 11. The upper surface of the step portion 36 is aligned with that of the overhang portion 29 and is one-step lower than an upper side surface 37 of the lower half 11.

The spring 20 is inserted, as shown in FIG. 15. In particular, the tip of the L-shaped hook 24 of the spring 20 is slidably guided into the recess 27 along the upper surfaces of the overhang portion 29 and the step portion 36 while the tip of the hook 24 is urged against the inclined surface 35, as shown in FIG. 15. This insertion involves only linear movement. Since the step portion 36 is provided, the insertion angle of the spring 20 can be small, so that the insertion can be easily performed. Furthermore, since the L-shaped hook 24 of the spring 20 has a round corner, the spring 20 can be smoothly inserted into the spring insertion opening without any hitch.

As has been apparent from the above description, the V-shaped torsion spring is used as the spring for biasing the shutter in the closed position. The lengths of the linear arm portions integrally formed with both sides of the coiled portion of the spring are approximately the same. Both tips of the arm portions are bent at approximately 90° so as to form the L-shaped hooks which has the same length and which extend in the opposite directions along the height of the coiled portion. The L-shaped hooks are stopped by the shutter and the cassette case. Therefore, the V-shaped shutter spring has the point-symmetry shape which has the coiled portion as the center, and any one of the L-shaped hooks can be stopped the shutter or the cassette case. Consequently, the spring can be simply manufactured, assembly efficiency is remarkably improved and automatic assembly can be easily performed.

What is claimed is:

1. A magnetic disc cassette comprising, a flexible magnetic disc, a casing comprising an upper shell and a lower shell for containing the flexible magnetic disc therebetween, a head access hole provided in said casing for exposing a portion of the flexible magnetic disc to permit recording and/or reproducing operation, a shutter reciprocably mounted on one edge of said casing and selectively positionable in a closed position and an open position, said shutter including a shutter hole and said access hole being accessible through said shutter hole in said open position, a V-shaped shutter spring urging said shutter toward said closed position, said V-shaped shutter spring having legs lying generally in a plane parallel to the path of movement of the shutter and each leg having an L-shaped hook formed generally perpendicular to said plane at its respective tip, hook means provided in said shutter for engaging one of said L-shaped hooks, and a recess provided in one of said shells of said casing for confining the other of said L-shaped hooks, said recess having a guiding portion which permits the other of said L-shaped hooks to pass to said recess.

2. A flexible magnetic cassette according to claim 1 wherein said L-shaped hooks respectively extend in opposite directions from each other.

3. A flexible magnetic cassette according to claim 1 wherein said guiding portion has a lower step portion and a side face portion, the other of said L-shaped hooks being slidably guided by said lower step portion and said side face portion during assembly of said shutter on said casing.

* * * * *